Dec. 6, 1955            J. W. SYKES            2,725,638
CENTERING INDICATOR
Filed April 8, 1953
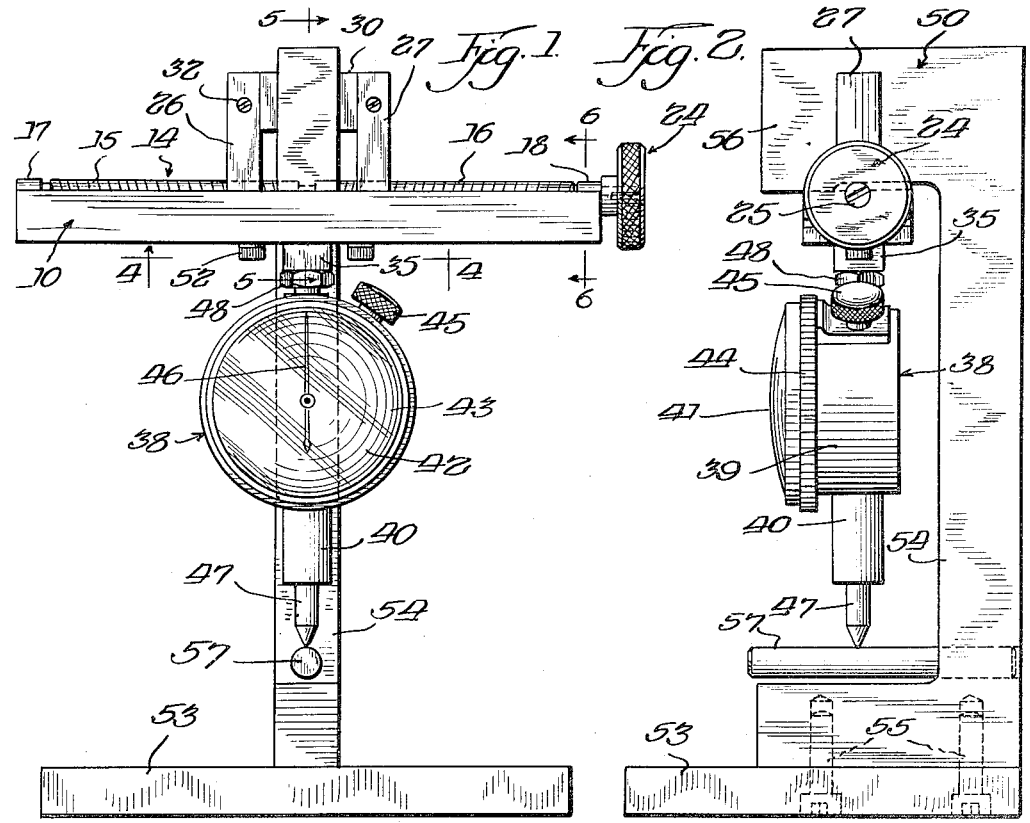
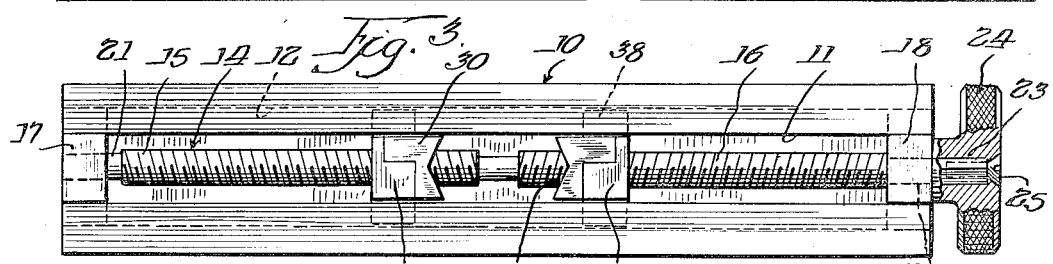
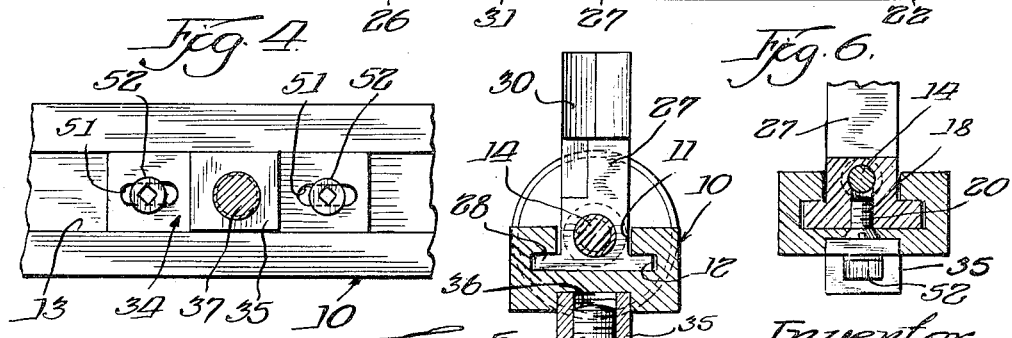

United States Patent Office

2,725,638
Patented Dec. 6, 1955

2,725,638

CENTERING INDICATOR

Jerome W. Sykes, Chicago, Ill.

Application April 8, 1953, Serial No. 347,497

2 Claims. (Cl. 33—185)

The invention relates to a centering instrument adapted for use by machinists and other artisans as a tool for centering the work on milling machines, grinders, drill presses and the like, and has reference more particularly to a centering indicator for accurately determining the top dead center of a shaft, or a taper, or other workpiece of similar shape.

In the operation of a grinding machine, for example, it has heretofore been necessary for the machinist to guess his way on tapers since the machine requires a compound setting that does not give accurate results even with minute graduations. Also in grinding splines on round body brooches the splines are required to be dead top center of the round body, so that it has been necessary for the machinist to make several precise measurements of a time consuming nature and even then the accuracy of the operation was not better than five-thousandths of an inch.

It is an object of the present invention to provide a new and novel centering instrument which will have extended usefulness on all round body work where the top dead center position must be located, which will require only two or three minutes to set up on a grinder or similar machine for obtaining the desired information, and wherein accuracy can be obtained to within five ten-thousandths of an inch.

A further object of the invention is to provide a new and novel centering instrument that can be clamped to the tool of the machine, whereby to enable the machinist to center the tool in the exact position for operation. Therefore, the utility of the present indicator is not limited to grinders or to the operation of grinding splines. In actual practice the instrument will have utility with respect to all round body work where top dead center must be located, as, for example, keyway work, in work on tapers, and in all drilling operations on shafts and the like.

A further object is to provide a centering indicator having a pair of adjustable arms for clamping the indicator to the wheel of a grinder or the like and which will also incorporate a type of conventional dial indicator micrometer so that the maximum accuracy can be obtained in the use of the device.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts:

Figure 1 is a front elevational view showing the centering indicator of the invention in a pre-setting relation with its master gauge;

Figure 2 is a side elevational view of the centering indicator in combination with its master gauge as shown in Figure 1;

Figure 3 is a top plan view of the centering indicator showing the basic constructional details of the same;

Figure 4 is a fragmentary view taken substantially along line 4—4 of Figure 1 and illustrating the adjustability of the indicator support plate;

Figure 5 is a transverse sectional view taken substantially along line 5—5 of Figure 1; and Figure 6 is a transverse sectional view taken substantially along line 6—6 of Figure 1.

Referring to the drawings, which show a preferred embodiment of the present invention, the numeral 10 indicates the base or body portion of the device and which body portion is preferably formed of metal and generally rectangular in shape. Centrally of the top surface and extending longitudinally of the base the same is formed with a groove of inverted T-shape, or, in other words, the said groove includes an entrance opening 11 and undercut passages 12. On the bottom side of said base, also extending longitudinally thereof, there is provided a conventional groove 13 having straight parallel sides. Referring again to the entrance passage 11 formed on the top surface of the base, it will be observed that the said passage accommodates threaded shaft 14 which provides an elongated screw, the same being characterized by right and left hand threaded sections. More particularly the left hand section of the threaded shaft 14, as viewed in Figure 1, is provided with left hand threads indicated by numeral 15, whereas the right hand section of the shaft is provided with right hand threads indicated by numeral 16. The said threaded shaft is journalled at its respective ends by the end journalling members 17 and 18, as best shown in Figures 3 and 6, the said journalling members also having the shape of an inverted T for interfitting with recesses of complementary shape formed in the respective ends of the base 10. Each end journalling member is held in position by a threaded set screw such as 20. The threaded shaft 14 has its left end reduced in diameter as at 21 and which end is rotatably mounted by member 17 for journalling said shaft. At its opposite end the shaft is likewise reduced in diameter, forming the portion 22, and which extends through member 18, being journalled thereby to extend beyond the member for providing the squared end 23. The knurled wheel 24 is mounted on the squared end 23 of the threaded shaft 14 and the wheel is held in position by set screw 25.

The purpose of the inverted T-shaped groove in the base member 10 is to accommodate a pair of movable arms such as 26 and 27 which are located in the groove and operatively connected by means of the threaded shaft 14 so as to have movement toward and away from each other. The base of each arm includes laterally extending flanges such as 28 and which have location in the undercut passages 12. As a result the arms, although movable within the groove, have the maximum strength and rigidity for their size and due to the laterally extending flanges 28 the arms are able to withstand considerable bending stresses applied thereto either laterally or longitudinally of the base member. Also each arm is recessed at its upper end for receiving an insert in the form of an adapter 30. The adapter 30 is provided with a V-shaped forward surface identified by numeral 31 so that the particular adapter here shown is best suited for engaging a cylindrical object such as the drill of a drill press. Since the adapters are each held in place by means of set screw 32, it is possible to remove the adapter and insert another one in its place, which, instead of having a V-shaped surface, may be plane surfaces or serrated, or arcuately concaved. It is, of course, understood that the special formation for the adapter will be determined by the particular work on which the indicator is being used at the time.

Since arm 26 has threaded engagement with the left hand threads 15, whereas arm 27 has threaded engagement with the right hand threads 16, it will be seen that rotation of the threaded shaft in one direction will cause the arms to move toward each other, whereas rotation of the shaft in an opposite direction will cause the arms to move away from each other. In assembling the arms on the threaded shaft it is desired that they be located equal distances on respective sides of the longitudinal center of the shaft. Precision in this respect is extremely difficult because it is practically impossible to form the right and left hand screw sections on the shaft in accurate relation to each other. Accordingly, the invention provides an adjustable support plate for the indicator of the present device, which structure will now be described.

The support plate 34 is received by groove 13, formed on the underside of the base, and said support plate is mounted for limited movement in a longitudinal direction. Said plate is provided with a central hub portion 35 having a centrally threaded recess 36 for receiving the threaded end of the stem 37, provided by the micrometer 38. Said micrometer provides the indicator for the present device and essentially consists of the cylindrical body portion 39 having the depending stem 40 and on which is suitably mounted the transparent crystal 41. The dial 42 on which indicia such as 43 are printed is formed as a unit with the crystal so that the unitary structure can be rotatably positioned on the body portion 39 by manipulation of the knurled collar 44. The knurled adjusting screw 45 must be rotated first to release the unitary structure, including dial 42, before the same can be rotated so as to vary its position with respect to needle 46. When the proper rotative adjustment of the dial has been secured the unitary structure is locked in position by rotating screw 45 in a reverse direction. The pin 47 and needle 46 are operatively connected, as is well understood in all micrometer gauges, so that a deflection of the needle is obtained upon movement of pin 47 in a direction inwardly or outwardly of stem 40. The dial 42 of the micrometer is divided into graduations which indicate movement of the pin 47 to a thousandth of an inch. With the threaded stem 37 threaded into hub portion 35 the micrometer is locked in desired position with respect to the base 10 by means of the locking nut 48.

It will be understood that indicator 38 must be accurately positioned on the center line with respect to arms 26 and 27. This positioning of the indicator can be checked from time to time by means of the master gauge 50 to be presently described. However, to provide for adjustability of the indicator on the base 10 the invention renders it possible to adjust the position of the indicator support plate 34 longitudinally within its groove 13. The respective side portions of the plate 34 are formed with elongated slots 51 which accommodate set screws 52 which in turn are threadedly secured to base 10. The screws 52 have socket openings so that they can be turned in a releasing direction for releasing plate 34. This allows lateral positioning of the plate and thus lateral positioning of micrometer 38 in order to accurately locate the same on the center line as regards arms 26 and 27. When this position of the micrometer has been secured the screws 52 are tightened and the plate 34, and thus the micrometer, are locked to base 10.

The master gauge 50 illustrates the manner in which the present centering instrument is used to determine the top dead center of a shaft. The master gauge consists of a base 53 to which the upright 54 is secured by means of the screws 55. The upright 54 terminates at its upper end in an overhanging head portion 56. The present indicator is applied to the master gauge in the same manner as it is applied to the grinding wheel of a grinder, or the cutting tool of a milling machine, or to the drill of a boring machine. The arms 26 and 27 are clamped to the head portion 56 so that the indicator 38 depends therefrom with the pin 47 resting on the high spot of the fixed shaft 57. Since the master gauge is employed to check the accuracy of the present centering device, it will be understood that the fixed shaft 57 is located on the exact vertical center line of the upright 54 and head portion 56. For checking purposes the set screws 52 may be released which will permit adjustment of the indicator support plate 34. The micrometer and pin 47 can thus be lined up accurately with respect to arms 26 and 27 and when proper adjustment has been obtained the screws 52 are tightened to lock the indicator support plate to base 10.

The present centering instrument functions in actual practice in substantially the same manner as above described in connection with the master gauge 50. The arms 26 and 27 are clamped to the grinding wheel, cutting tool, drill or the like, and the workpiece is moved laterally with respect to pin 47. By noting the deflection of the needle 46 it is relatively easy to determine the high spot of the shaft or other round body comprising the workpiece and when said position has been obtained the workpiece is fixedly secured, the centering indicator is removed, and the machinist is ready to start operations on the workpiece.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a centering indicator of the type described, an elongated body member of substantially rectangular shape in transverse section, said body member having a longitudinal groove formed in the top surface and extending the length of the body member, a threaded shaft disposed within the said groove and being journalled for rotation at respective ends of the body member, right and left hand threaded sections formed on said shaft on respective sides of the longitudinal center thereof, a pair of arms mounted by said groove for movement lengthwise of the groove and having threaded relation with the threaded sections respectively, whereby said arms have movement simultaneously and to an equal extent in directions toward and away from each other upon rotation of the threaded shaft, an indicator support plate adjustably fixed to the body member on the side opposite the arms and being accurately centered with respect to the arms, an indicator fixed to said support plate centrally thereof, and said indicator providing a movable contact element which projects from the indicator in a direction away from the arms.

2. A centering indicator as defined by claim 1, wherein the body member has a second longitudinal groove formed therein on the side opposite the first mentioned groove, wherein the indicator support plate has location within the second groove, and wherein the support plate is adjustably fixed to the body member by means of screws having threaded relation with the body member and which pass through elongated openings in the support plate.

References Cited in the file of this patent

UNITED STATES PATENTS

| | | |
|---|---|---|
| 2,156,500 | Jeschor | May 2, 1939 |
| 2,493,332 | Aubin | Jan. 3, 1950 |
| 2,547,683 | Blesi | Apr. 3, 1951 |
| 2,559,280 | Cochran | July 3, 1951 |
| 2,599,835 | Johnson et al. | June 10, 1952 |

FOREIGN PATENTS

| | | |
|---|---|---|
| 399,007 | Italy | Oct. 14, 1942 |